United States Patent
Ahn et al.

(10) Patent No.: US 9,454,855 B2
(45) Date of Patent: Sep. 27, 2016

(54) MONITORING AND PLANNING FOR FAILURES OF VEHICULAR COMPONENTS

(71) Applicant: International Business Machines Corporation, Armonk, NY (US)

(72) Inventors: Hyung-il Ahn, San Jose, CA (US); Matthew Denesuk, Ridgefield, CT (US); Axel Hochstein, San Jose, CA (US); Ying Tat Leung, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/498,714

(22) Filed: Sep. 26, 2014

(65) Prior Publication Data
US 2016/0093119 A1 Mar. 31, 2016

(51) Int. Cl.
*G07C 5/00* (2006.01)
(52) U.S. Cl.
CPC .................................... *G07C 5/006* (2013.01)
(58) Field of Classification Search
None
See application file for complete search history.

(56) References Cited

U.S. PATENT DOCUMENTS

| | | | |
|---|---|---|---|
| 5,280,223 A * | 1/1994 | Grabowski | B60K 6/46 180/65.245 |
| 5,791,441 A | 8/1998 | Matos et al. | |
| 6,085,154 A | 7/2000 | Leuthausser et al. | |
| 6,330,499 B1 | 12/2001 | Chou et al. | |
| 6,424,930 B1 | 7/2002 | Wood | |
| 6,484,080 B2 | 11/2002 | Breed | |
| 6,748,305 B1 | 6/2004 | Klausner et al. | |
| 6,834,256 B2 | 12/2004 | House | |
| 7,103,460 B1 | 9/2006 | Breed | |
| 7,369,925 B2 | 5/2008 | Morioka et al. | |

(Continued)

FOREIGN PATENT DOCUMENTS

| | | |
|---|---|---|
| CN | 103778339 A | 5/2014 |
| EP | 0126402 A2 | 11/1984 |

(Continued)

OTHER PUBLICATIONS

IP.COM, Method for Visual Life Indication of Flash Based Storage Devices, IPCOM000236342D, Apr. 21, 2014.

(Continued)

*Primary Examiner* — John R Olszewski
*Assistant Examiner* — Jason Roberson
(74) *Attorney, Agent, or Firm* — Ryan, Mason & Lewis, LLP

(57) ABSTRACT

Methods, systems, devices and computer program products for planning for failures of vehicular components are provided herein. A method includes obtaining a first set of data of maintenance events recorded for multiple vehicular components across multiple vehicles in a fleet; obtaining a second set of data of maintenance work orders performed on the vehicular components; obtaining a third set of data of measurements taken in connection with the vehicular components; analyzing (i) the first set of data and (ii) the second set of data to identify component failure events associated with the multiple vehicular components; determining failure indicators for each of the vehicular components in each of the vehicles in the fleet based on the second set of data, the third set of data, and the identified component failure events; and outputting the indicators in multiple visualized forms, each representing one of multiple levels of granularity.

20 Claims, 7 Drawing Sheets

(56) References Cited

U.S. PATENT DOCUMENTS

| | | | |
|---|---|---|---|
| 7,383,165 B2 | 6/2008 | Aragones | |
| 7,418,321 B2 | 8/2008 | Boutin | |
| 7,428,541 B2 | 9/2008 | Houle | |
| 7,474,988 B2 | 1/2009 | Kamisuwa et al. | |
| 7,489,994 B2 | 2/2009 | Isono et al. | |
| 7,567,972 B2 | 7/2009 | Geiselhart et al. | |
| 7,920,944 B2 | 4/2011 | Gould | |
| 8,024,084 B2 | 9/2011 | Breed | |
| 8,068,104 B2 | 11/2011 | Rampersad | |
| 8,131,420 B2 | 3/2012 | Lynch et al. | |
| 8,200,389 B1 | 6/2012 | Thompson et al. | |
| 8,224,765 B2 | 7/2012 | Khalak et al. | |
| 8,229,624 B2 | 7/2012 | Breed | |
| 8,229,900 B2 | 7/2012 | Houle | |
| 8,285,438 B2 | 10/2012 | Mylaraswamy et al. | |
| 8,311,858 B2 | 11/2012 | Everett et al. | |
| 8,359,134 B2 | 1/2013 | Maesono | |
| 8,374,745 B2 | 2/2013 | Zhang et al. | |
| 8,452,481 B2 | 5/2013 | Ishiko et al. | |
| 8,543,280 B2 | 9/2013 | Ghimire | |
| 8,548,671 B2 | 10/2013 | Wong et al. | |
| 8,626,385 B2 | 1/2014 | Humphrey | |
| 8,676,631 B2 | 3/2014 | Basak | |
| 2003/0095278 A1 | 5/2003 | Schwartz et al. | |
| 2003/0137194 A1 | 7/2003 | White | |
| 2005/0065678 A1* | 3/2005 | Smith | G07C 5/008 |
| | | | 701/31.4 |
| 2008/0036487 A1 | 2/2008 | Bradley | |
| 2010/0332201 A1 | 12/2010 | Albarede et al. | |
| 2011/0118905 A1 | 5/2011 | Mylaraswamy | |
| 2013/0035822 A1 | 2/2013 | Singh et al. | |
| 2014/0336869 A1 | 11/2014 | Bou-Ghannam et al. | |

FOREIGN PATENT DOCUMENTS

| | | |
|---|---|---|
| EP | 1110096 B1 | 6/2011 |
| EP | 2730448 A1 | 5/2014 |
| JP | 06331504 A | 12/1994 |
| JP | 07028523 A | 1/1995 |
| JP | 2008052660 A | 3/2008 |

OTHER PUBLICATIONS

IP.COM, IBM, Wear-Leveling Technique for EEPROM devices, IPCOM000187712D, Sep. 2009.
Jardine et al. Optimizing a Mine Haul Truck Wheel Motors' Condition Monitoring Program: Use of Proportional Hazard Modeling, Case Study Report, Optimal Maintenance Decision Inc. 2001.
Tian et al. Condition Based Maintenance Optimization Considering Multiple Objectives, Journal of Intelligent Manufacturing 23, 2, 333-340. 2012.
J. Rust, Optimal Replacement of GMC Bus Engines: An Empirical Model of Harold Zurcher, Econometrica 55, 5, 999-1033. 1987.
Zhu et al. Intelligent Maintenance Support System for Syncrude Mining Trucks, 1993 Canadian Conference on Electrical and Computer Engineering, Vancouver, 1217-1220.
Lam et al. Optimal Maintenance—Policies for Deteriorating Systems under Various Maintenance Strategies, IEEE Transactions on Reliability 43, 3, 423-430. 1994.
Wu et al. A Neural Network Integrated Decision Support System for Condition-Based Optimal Predictive Maintenance Policy, IEEE Transactions on Systems, Man, and Cybernetics Part A: System and Humans, 37, 2, 226-236. 2007.
Murphy, Kevin P. Machine Learning: a Probabilistic Perspective, The MIT Press, 2012. Table of Contents. YEAR YEAR YEAR.
Wikipedia, Survival Analysis, Sep. 18, 2014, https://en.wikipedia.org/w/index.php? title=Survival_analysis&oldid=626053780.
Therneau, Terry. Extending the Cox Model, Technical Report No. 58, Nov. 1996.
Hastie et al. The Elements of Statistical Learning: Data Mining, Inference and Prediction, The Mathematical Intelligencer 27.2 (2005): 83-85.
Mannila et al. Discovery of Frequent Episodes in Event Sequences, Data Mining and Knowledge Discovery 1.3 (1997): 259-289.
Bair et al. Prediction by Supervised Principal Components, Journal of the American Statistical Association, 101(473). 2006.
Banjevic et al. A Control-Limit Policy and Software for Condition-Based Maintenance Optimization, INFOR-OTTAWA-, 39(1), 32-50. 2001.
Fox J. Cox Proportional-Hazards Regression for Survival Data, 2002.
Jardine et al. Repairable System Reliability: Recent Developments in CBM Optimization, International Journal of Performability Engineering, 4(3), 205. 2008.
Scholkopf et al. Learning with Kernels, MIT press Cambridge, 2002.
Wu et al. Optimal Replacement in the Proportional Hazards Model with Semi-Markovian Covariate Process and Continuous Monitoring, Reliability, IEEE Transactions on, 60(3),580-589. 2011.
Zaki, M.J. Spade, An Efficient Algorithm for Mining Frequent Sequences, Machine Learning, 42(1-2), 31-60.
Bachetti et al. Survival Trees with Time-Dependent Covariates: Application to Estimating Changes in the Incubation Period of AIDS, Lifetime Data Anal., vol. 1, No. 1, pp. 35-47, 1995.
Breiman et al. Classification and Regression Trees, 1st ed. Chapman and Hall/CRC, 1984.
Friedman et al. Additive Logistic Regression: a Statistical View of Boosting, (With Discussion and a Rejoinder by the Authors), Ann. Stat., vol. 28, No. 2, pp. 337-407, Apr. 2000.
Hothorn et al. Survival Ensembles, Biostat, vol. 7, No. 3, pp. 355-373, Jul. 2006.
Huang et al. Piecewise Exponential Survival Trees with Time-Dependent Covariates, Biometrics, vol. 54. No. 4, pp. 1420-1433, Dec. 1998.
Motorola Inc. et al. New Method and Apparatus for Device Failure Assessment, IPCOM000159857D, Oct. 2007.
IBM, Method of Component Failure Prediction in Large Server and Storage Systems, Jan. 13, IPCOM000191729D, 2010.
An et al. Fatigue Life Prediction Based on Bayesian Approach to Incorporate Field Data into Probability Model, Structural Engineering and Mechanics, vol. 37, No. 4, p. 427-442, 2011.
Jardine et al. A Review on Machinery Diagnostics and Prognostics Implementing Condition-Based Maintenance, in: Mechanical Systems and Signal Processing, 20, 2006, pp. 1483-1510.
Peng et al. Current Status of Machine Prognostics in Condition-Based Maintenance: a Review, in: International Journal of Advanced Manufacturing Technology, 50, 2010, pp. 297-313.
Lin et al. Filters and Parameter Estimation for a Partially Observable System Subject to Random Failure with Continuous-Range Observations, in: Advances in Applied Probability, 36(4), 2004, pp. 1212-1230.
Lin et al. On-Line Parameter Estimation for a Failure-Prone System Subject to Condition Monitoring, in: Journal of Applied Probability, 41(1), 2004, pp. 211-220.
S. Mussi, General Environment for Probabilistic Predictive Monitoring, International Journal of Computers vol. 7, No. 2, 31-49. 2013.
S. Mussi, Probabilistic Predictive Monitoring with CHEERUP, International Journal of Computers vol. 6, No. 1, 93-102. 2012.
Liao et al. Predictive Monitoring and Failure Prevention of Vehicle Electronic Components and Sensor Systems, SAE Technical Paper 2006-01-0373, 2006, doi:10.4271/2006-01-0373. 2006.
Jardine et al. Repairable System Reliability: Recent Developments in CBM Optimization, 19th International Congress and Exhibition on Condition Monitoring and Diagnostic Engineering Management (COMADEM). Lulea, Sweden, Jun. 2006.
Ataman et al. Knowledge Discovery in Mining Truck Databases, Proceedings. 17th International Mining Congress, The Chamber of Mining Engineers of Turkey, Ankara, 2001.
Hu et al. Early Detection of Mining Truck Failure by Modeling its Operation with Neural Networks Classification Algorithms, Application of Computers and Operations Research in the Minerals Industries, South African Institute of Mining and Metallurgy, 2003.

(56) References Cited

OTHER PUBLICATIONS

Ahmad et al. An Overview of Time-Based and Condition-Based Maintenance in Industrial Application, Computers and Industrial Engineering 63, 1, 135-149. 2012.
Jardine et al., "Optimal replacement policy and the structure of software for condition-based maintenance," Journal of Quality in Maintenance Engineering 3, 2, 109-119. 1997.
Jardine et al., Maintenance, replacement, and reliability: theory and applications. CRC Press LLC, 2013.
Zhang, An Introduction to Support Vector Machines and Other Kernel-Based Learning Methods—A Review. AI Magazine vol. 22 No. 2 (2001).
Singer et al., Applied longitudinal data analysis: Modeling change and event occurrence. http://gseacademic.harvard.edu/alda/. Jun. 1, 2005.
Lin et al., "Using principal components in a proportional hazards model with applications in condition-based maintenance," Journal of Operational Research Society 57, 910-919. 2006.
List of IBM Patents or Applications Treated as Related.

\* cited by examiner

FIG. 5

MONITORING AND PLANNING FOR FAILURES OF VEHICULAR COMPONENTS

FIELD OF THE INVENTION

Embodiments of the invention generally relate to information technology, and, more particularly, to equipment monitoring and management.

BACKGROUND

In industries that implement high-value machinery such as heavy industrial vehicles, managing the total cost of maintenance is of high importance because the replacement cost of such components is significant, as is the equipment downtime cost. Management of such machinery includes monitoring the health status of the vehicles and attempting to plan for upcoming component failures. Such attempts, however, face numerous challenges. For example, component failures appear to occur at random and are difficult to predict. Also, operating time alone does not characterize the life of a component accurately, as each vehicle may be utilized differently and/or utilized in different environments, resulting in different useful remaining lives.

Accordingly, a need exists for techniques to monitor and manage equipment maintenance across different failure causes including wear under normal operation, event-driven failures and failures due to manufacturing defects.

SUMMARY

In one aspect of the present invention, techniques for monitoring and planning for failures of vehicular components are provided. An exemplary computer-implemented method can include obtaining a first set of data comprising maintenance events recorded in connection with multiple vehicular components across multiple vehicles in a fleet of vehicles, wherein said obtaining the first set of data comprises forming a connection between (i) a first database and (ii) a vehicular management device. The method also includes obtaining a second set of data comprising maintenance work orders performed on the multiple vehicular components across multiple vehicles in the fleet of vehicles, wherein said obtaining the second set of data comprises forming a connection between (i) a second database and (ii) the vehicular management device. Further, the method additionally includes obtaining a third set of data comprising a collection of measurements taken in connection with the multiple vehicular components, wherein said obtaining the third set of data comprises forming a connection between (i) multiple sensors resident on and/or associated with the multiple vehicles in the given fleet of vehicles and (ii) the vehicular management device. Additionally, the method includes analyzing (i) the first set of data and (ii) the second set of data to identify one or more component failure events associated with the multiple vehicular components; and determining multiple failure indicators for each of the multiple vehicular components in each of the multiple vehicles in the given fleet of vehicles based on (i) the second set of data, (ii) the third set of data, and (iii) the one or more identified component failure events, wherein the multiple failure indicators comprise at least (a) a manufacturing defect-related failure indicator, (b) a wear-related failure indicator, and (c) a non-wear related failure indicator. Further, the method includes outputting the multiple indicators in multiple visualized forms, wherein each of the multiple visualized forms represents one selected from the group consisting of: (i) a level of the given fleet of vehicles, (ii) a level of a single vehicle selected from the given fleet, (iii) a level of one of the multiple vehicular components of the selected single vehicle, and (iv) a level of one of the multiple indicators associated with the one vehicular component of the selected single vehicle.

In another aspect of the invention, a vehicular management device can include a vehicular component status determination engine, executing on the vehicular management device, to analyze (i) a first set of data comprising maintenance events recorded in connection with multiple vehicular components across multiple vehicles in a fleet of vehicles and (ii) a second set of data comprising maintenance work orders performed on the multiple vehicular components across the multiple vehicles in the given fleet of vehicles to identify one or more component failure events associated with the multiple vehicular components. The vehicular management device also includes a vehicular component manufacturing defect-related failure indicator engine, executing on the vehicular management device, to calculate a manufacturing defect-related failure indicator for each of the multiple vehicular components in each of the multiple vehicles in the fleet of vehicles based on (i) the second set of data, (ii) a third set of data comprising a collection of measurements taken in connection with the multiple vehicular components, and (iii) the one or more identified component failure events. Further, the vehicular management device includes a vehicular component wear-related failure indicator engine, executing on the vehicular management device, to calculate a wear-related failure indicator for each of the multiple vehicular components in each of the multiple vehicles in the given fleet of vehicles based on (i) the second set of data, (ii) the third set of data, and (iii) the one or more identified component failure events. Also, the vehicular management device includes a vehicular component non-wear related failure indicator engine, executing on the vehicular management device, to calculate a non-wear related failure indicator for each of the multiple vehicular components in each of the multiple vehicles in the given fleet of vehicles based on (i) the second set of data, (ii) the third set of data, and (iii) the one or more identified component failure events. Additionally, in the vehicular management device, the vehicular component status determination engine, the vehicular component manufacturing defect-related failure indicator engine, the vehicular component wear-related failure indicator engine, and the vehicular component non-wear related failure indicator engine, are coupled to a graphical user interface for user manipulation of (i) the manufacturing defect-related failure indicator, (ii) the wear-related failure indicator, and (iii) the non-wear related failure indicator for each of the multiple vehicular components.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a diagram illustrating a screen shot of a component detail screen, according to an embodiment of the invention;

DETAILED DESCRIPTION

As described herein, an aspect of the present invention includes techniques for monitoring and planning for failures of vehicular components. At least one embodiment of the invention includes utilizing, as further detailed herein, a set of time series of maintenance events recording for a given vehicular component, a set of time series of maintenance work orders for the given vehicular component, and a set of time series of sample data points, wherein each sample data point includes a combination of measurements of the vehicular component up to the present time. The time series noted above can be derived, for example, from data collected from the maintenance history of the relevant vehicles, as well as sensor readings from the relevant vehicles. Utilizing the noted time series, such an embodiment includes generating and/or providing a dashboard for managing and displaying the health status of the given vehicular component by estimating component failures, calculating failure indicators, and displaying the health status information.

The dashboard, in accordance with one or more embodiments of the invention, displays generated parameters related to a fleet of vehicles. Such parameters can include (i) indications of the status at the present time of a selected vehicle in the fleet in terms of age (such as operating hours, number of past work orders, etc.), (ii) a wear-related failure status of each identified and/or selected vehicular component (such as taught, for example, in the U.S. patent application Ser. Nos. 14/498,686 and 14/498,693, entitled "Generating Cumulative Wear-Based Indicators for Vehicular Components" and "Integrating Economic Considerations to Develop a Component Replacement Policy Based on a Cumulative Wear-Based Indicator for a Vehicular Component," respectively, both filed concurrently herewith and both incorporated by reference herein in their entireties), (iii) a non-wear related failure status of each identified and/or selected vehicular component (such as taught, for example, in the U.S. patent application Ser. Nos. 14/498,703 and 14/498,707, entitled "Generating Estimates of Failure Risk for a Vehicular Component" and "Generating Estimates of Failure Risk for a Vehicular Component in Situations of High-Dimensional and Low Sample Size Data," respectively, both filed concurrently herewith and both incorporated by reference herein in their entireties), and (iv) a manufacturing defect-related failure status (such as derived, for example, from the history of vehicles similar to the given vehicle). As detailed herein, and in the above-noted relevant applications, wear-related failure data can be derived, for example, using indicators such as the number of operating hours, direct indicators such as the tire tread depth, etc. Also, non-wear related failure data can be derived, for example, using indicators inferred from various measurements.

Figure 1:
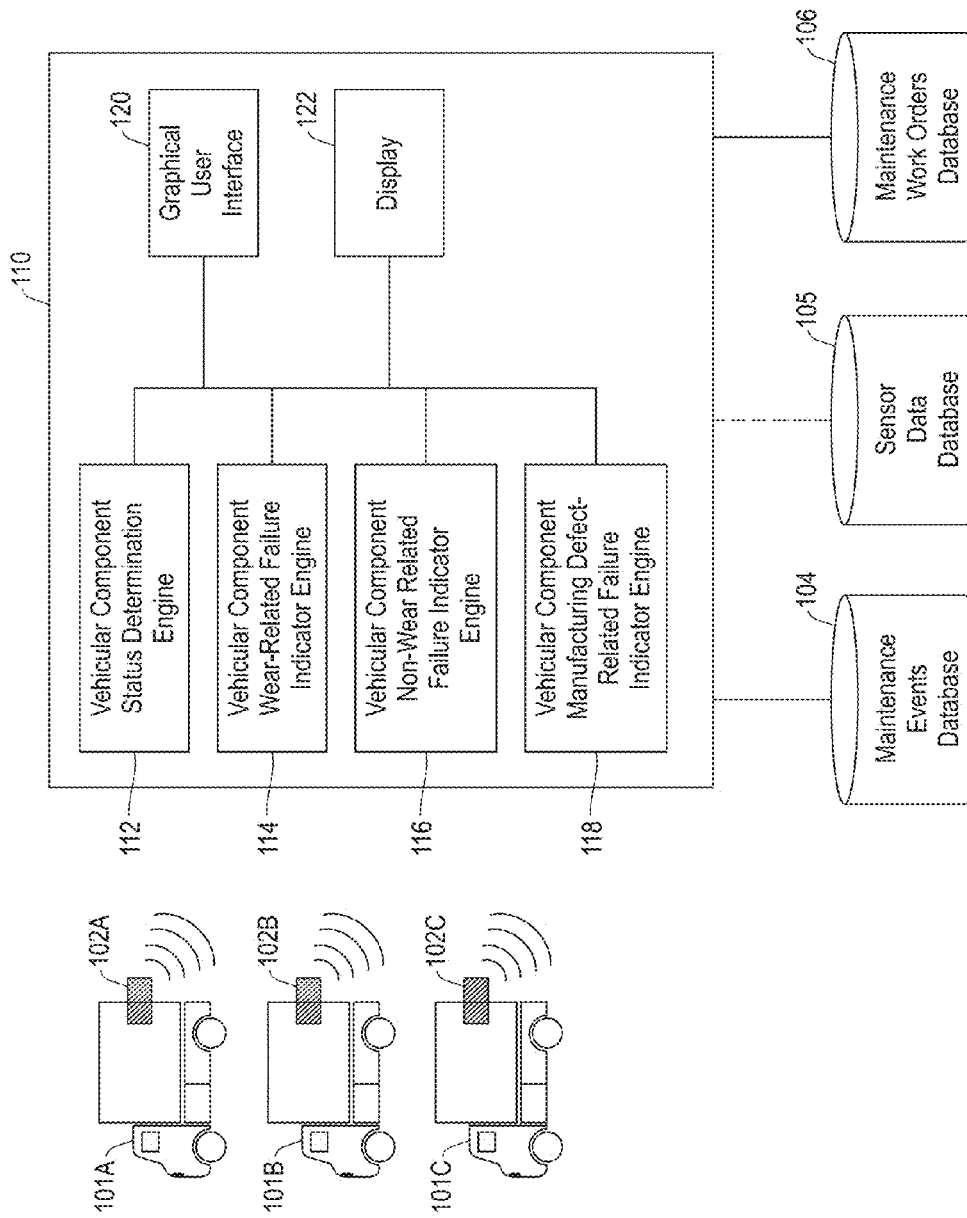
FIG. 1 is a diagram illustrating system architecture, according to an example embodiment of the invention.

FIG. 1 is a diagram illustrating system architecture, according to an example embodiment of the present invention. By way of illustration, FIG. 1 depicts a dashboard system 110, which receives input from sensors 102A, 102B and 102C resident on and/or connected to vehicles 101A, 101B and 101C, respectively. By way merely of example, the input from sensors 102A, 102B and 102C can be transmitted wirelessly to the dashboard system 110 and/or can be transmitted to the dashboard system 110 via a direct electrical connection (for instance, via creating an electrical connection or interface between a given sensor and the system 110 when the vehicle is in a maintenance shop and/or upon detaching the sensor from a given vehicle). In one or more embodiments of the invention, sensors 102A, 102B and 102C can alternatively (or additionally) transmit data or readings to a separate database such as sensor data database 105, and the dashboard system 110 can access the sensor data via the sensor data database 105. By way of example, sensors 102A, 102B and 102C can feed into a database such as database 105 via a third party application.

Additionally, the dashboard system 110 also receives input from a maintenance events database 104 and a maintenance work orders database 106.

As illustrated in FIG. 1, the dashboard system 110 includes a vehicular component status determination engine 112, a vehicular component wear-related failure indicator engine 114, a vehicular component non-wear related failure indicator engine 116, a vehicular component manufacturing defect-related failure indicator engine 118, a graphical user interface 120 and a display 122. As further detailed herein, engines 112, 114, 116 and 118 generate status and failure indicators for one or more given vehicular components based on the input provided by sensors 102A, 102B and 102C as well as from databases 104 and 106. The generated status and failure indicators for the given vehicular components are then transmitted to the graphical user interface 120 and the display 122 for presentation and/or potential manipulation by a user.

As described herein, failures due to and/or related to a manufacturing defect can be derived, for example, from a design, material, and/or production defect inherent in the vehicle. Failures due to wear can pertain, for example, to failures occurring as a result of standard wear accumulated during common or normal operation of the vehicle. Failures due to wear can also pertain, for example, to failures occurring as a result of abnormal wear. Such failures commonly relate, for instance, to accelerated wear, often caused by one or more factors that result in a given component not functioning within its intended design specifications. Such factors can include, as further detailed below, external factors.

Accordingly, failures due to external factors are commonly event-driven; that is, the failures can be traced to one or more concrete events. Such events can include, for example; human actions such as a vehicle operator error or a maintenance error, resultant actions caused by other components (for example, stress caused by a defect in or a misfit of a connected component), and/or actions caused by the environment (for example, actions caused by weather conditions). At least one embodiment of the invention includes monitoring vehicles and given vehicular components using different types of information for the different causes of failure, such as depicted in FIG. 1 and further described below.

Failures due to and/or related to a manufacturing defect can be monitored by identifying failures of similar vehicles. A given user can define a set of vehicles that is to be considered similar to the given vehicle(s) being monitored. Such a definition can be based, for example, on criteria such as the manufacturer, vehicle type, vehicle model, vehicle year, geographic location of the vehicles, vehicle operation time schedules, vehicle operation crew schedules, role or production type of the vehicles, calendar age of the vehicles, cumulative operating hours associated with the vehicles, cumulative work load of the vehicles, as well as one or more other user-defined criterion based on the specific characteristics of the user's given industry. Using such criteria (or a portion thereof), the given user can define a set of similar vehicles, and at least one embodiment of the invention includes subsequently calculating a report on the history of failures of the set of similar vehicles. Such a report can include, for example, summary statistics of failures per year per vehicle, as well as details pertaining to each failure if and/or when the user selects a particular failure for additional investigation.

Additionally, in one or more embodiments of the invention, historical failures for reasons of manufacturer recall or those previously identified as manufacturing defect by the user can also be reported. In generating such reports, at least one embodiment of the invention can include obtaining and utilizing data from sources such as a maintenance events database and a maintenance work orders database (databases 104 and 106, respectively, as depicted in FIG. 1). Such a database can include information derived, for example, from maintenance log books, production equipment or crew scheduling systems, production management systems, asset management systems, maintenance log books, and/or enterprise resource planning systems.

As noted herein, at least one embodiment of the invention additionally includes calculating various failure indicators (such as via engines 112, 114, 116 and 118 of system 110 illustrated in FIG. 1). For example, in connection with failures due to wear, at least one embodiment of the invention includes calculating the calendar age and cumulative operating hours of a given vehicle as two wear indicators. Also, other wear-related calculations can include the cumulative input to the given vehicle (the amount of fuel or energy consumed by the vehicle, the amount of raw material input processed, etc.), and the cumulative output from the given vehicle (production quantity, emission output, etc.). Data utilized for such wear-related calculations can be derived from sources such as asset management systems, production management systems, and/or enterprise resource planning systems.

Further, wear-related measures can be determined from (periodic) direct and indirect inspections of the vehicle. Direct inspection can include a direct measurement of a vehicular component (such as tire tread depth), visual inspection from a subject matter expert, or an x-ray inspection of the internals of the vehicle. Indirect inspection can include analyses of fluids used in the equipment (such as, for example, lubricating oil and coolant), as well as analyses of the emission of the vehicle.

At least one embodiment of the invention can include generating and/or utilizing one or more integrated indicators that combine the above wear-related failure indicators or a subset thereof. Such an integrated indicator can incorporate a weighted average of multiple indicators, with user-chosen weights. Further, one or more embodiments of the invention can include generating such a combined indicator via techniques such as taught, for example, in the U.S. patent application Ser. Nos. 14/498,686 and 14/498,693, entitled "Generating Cumulative Wear-Based Indicators for Vehicular Components" and "Integrating Economic Considerations to Develop a Component Replacement Policy Based on a Cumulative Wear-Based Indicator for a Vehicular Component," respectively, both filed concurrently herewith and both incorporated by reference herein in their entireties.

Additionally, in connection with failures due to abnormal wear, at least one embodiment of the invention includes calculating failure indicators that encompass the fraction (or amount) of time that a given vehicle is run beyond its design specifications (for example, beyond a maximum load, a maximum speed, a continuous operation time span, and/or beyond an environmental condition such as temperature). Such indicators capture abnormal wear due to overuse and are based on data collected by sensors on the vehicle or log books of operation (such as depicted in FIG. 1, for example). In at least one embodiment of the invention, one or more specific indicators can be chosen by a user, depending on the information available and the nature of the vehicle operation.

Further, at least one embodiment of the invention can include generating and/or utilizing one or more integrated indicators that combine multiple abnormal wear-related failure indicators or a subset thereof. Additionally, such an integrated indicator can incorporate a weighted average of multiple indicators, with user-chosen weights.

In connection with failures due to external factors, at least one embodiment of the invention includes calculating failure indicators that encompass failures caused by human action, such as detailed above, as well as failures caused by one or more other components. For example, such an embodiment can include calculating the number of failures of connected or neighboring equipment or components in a given time window. Also, at least one embodiment of the invention includes calculating failure indicators that encompass failures caused by the environment. Such an embodiment can include calculating statistics (for example, a daily average, a standard deviation, a maximum, a minimum, etc.) of user-specified environmental conditions in a given time window, including conditions such as temperature, rainfall, air pressure, air velocity, relative humidity, level of air pollution or contamination, sunlight exposure, etc. Data for such calculations can be derived, for example, from weather stations and/or on-site weather instruments.

Further, at least one embodiment of the invention can include generating and/or utilizing one or more indicators that combine time series data from multiple sensors or a subset thereof, such as described, for example, in the U.S. patent application Ser. Nos. 14/498,703 and 14/498,707, entitled "Generating Estimates of Failure Risk for a Vehicular Component" and "Generating Estimates of Failure Risk for a Vehicular Component in Situations of High-Dimensional and Low Sample Size Data," respectively, both filed concurrently herewith and both incorporated by reference herein in their entireties. Additionally, an integrated indicator can incorporate a weighted average of multiple indicators, with user-chosen weights.

As also described herein, at least one embodiment of the invention includes collecting data from relevant sources (such as sensors and/or various databases, as depicted in FIG. 1) periodically (for example, once a day), updating one or more relevant databases with the collected data, calculating component failure events as well as one or more indicators as detailed above, and updating one or more relevant databases with the calculated indicators.

Referring back to FIG. 1, the maintenance events database 104 can include information such as a maintenance log book, which contains a record of all maintenance events for a vehicle and/or given vehicular component. Such events encompass activities performed for the maintenance of a vehicle, such as component replacement, repair, inspection, or periodic maintenance tasks such as a fluid change. Additionally, the maintenance work orders database 106 can include information such as a work order book, which contains a list or collection of all maintenance shop work orders performed on a vehicle. Typically, only activities of a significant nature generate a work order, such as an activity requiring the use of a spare part, for example. A component replacement, however, does not always dictate that the component has experienced a failure. A component may be replaced according to a scheduled replacement time interval, for example. In such an instance, the component has not failed at replacement time.

If the component has indeed failed, at least one embodiment of the invention includes distinguishing between an end-of-life wear-related failure and an unexpected event (that is, a non-wear related failure), such as described in the following paragraph. In the wear-related instance, more attention can be paid to lifetime wear indicators, while in the non-wear related instance, attention can be paid to leading failure indicators. Accordingly, at least one embodiment of the invention can include calculating a component failure indicator from the history of maintenance events and work orders as follows.

Events are removed from consideration if they are not associated with a work order. Also, events are removed if they involve regularly-scheduled inspections and/or maintenance services. For maintenance log books that have a fail status field, all events with a fail status specifying a premature failure are marked and/or flagged. For all component replacement events, at least one embodiment of the invention includes calculating the life achieved percentage by dividing the lifetime operating hours by the expected life published by the manufacturer, and marking and/or identifying all replacement events with a life achieved percentage smaller than a pre-specified threshold (for example, 90%). Further, all events with at least one mark (from the above steps) are labeled as a component failure. The remaining component replacements (that is, the unmarked component replacements) represent end-of-life failures.

Referring again to FIG. 1, a user can access the graphical user interface 120 of the system 110 through one or more means such as, for example, via an intranet. By way of illustration and/or example, a user can be responsible for and/or attempting to manage a site or a fleet of vehicles. A possible goal of the user might include determining which vehicle(s) need(s) to be taken into the shop for maintenance and what activities need to be performed on the vehicle(s). To that end, the user accesses a site overview screen. An example of such a site overview screen is depicted in FIG. 2.

Figure 2:
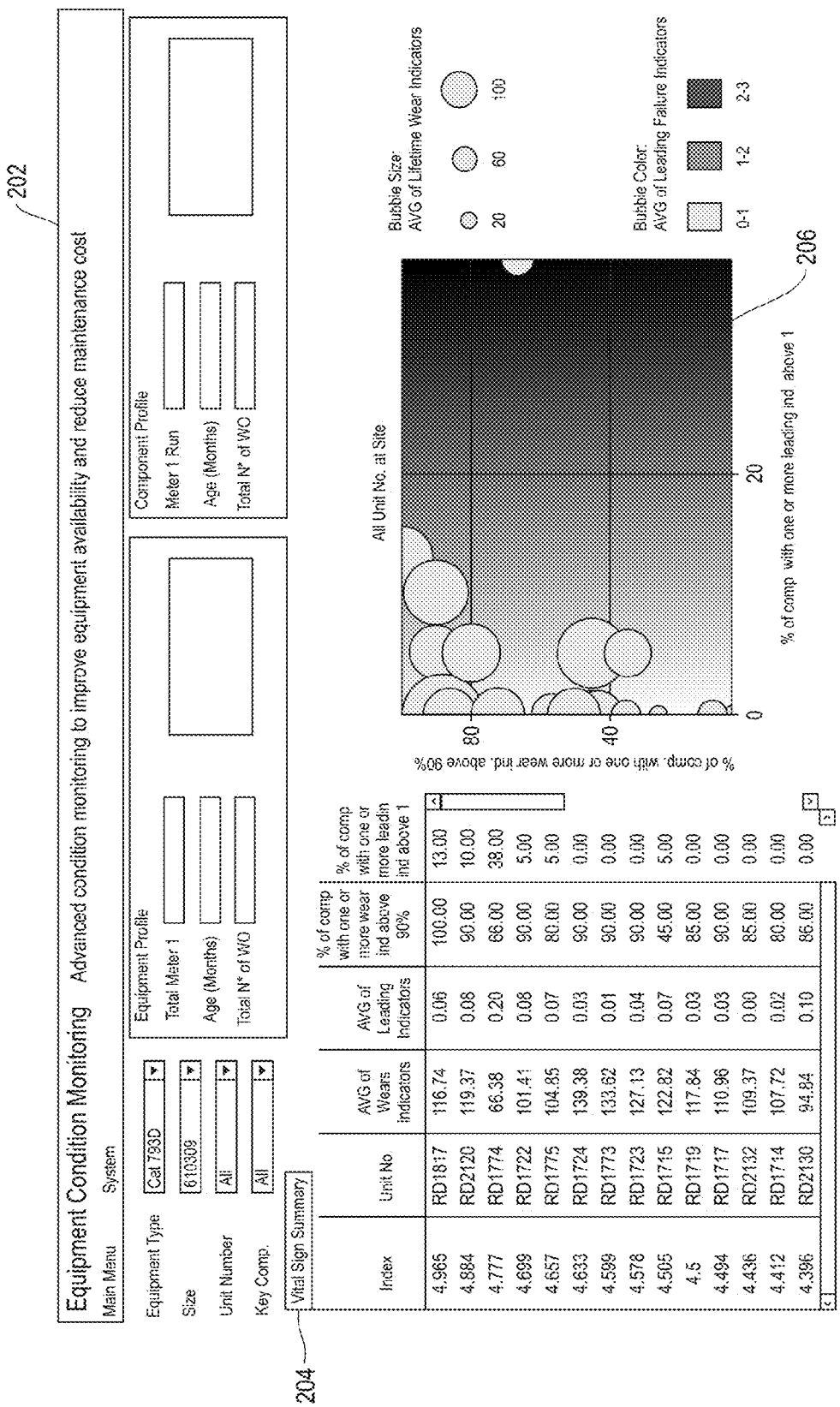
FIG. 2 is a diagram illustrating a screen shot of a site summary screen, according to an example embodiment of the invention.

By way of illustration, FIG. 2 depicts a screen shot 202 of a site summary screen that displays a summary of the health status of all vehicles at a given site. In this example screen shot 202, wear-related failure indicators are also referred to as "lifetime wear indicators" and non-wear related failure indicators are also referred to as "leading wear indicators." In table 204 of FIG. 2, the column labeled "Unit No" shows the identifier of each vehicle at the site, and the column labeled "AVG of Wear Indicators" shows the average, over all components pre-specified by the user during system setup, of all lifetime wear indicators for each vehicle at the site calculated by the system. This can include for example, a subset of the wear indicators described above. Additionally, the column labeled "AVG of Leading Indicators" shows the average, over all components pre-specified by the user during system setup, of all leading (non-wear related) failure indicators for each vehicle at the site calculated by the system. This can include for example, a subset of the non-wear related indicators described above. Further, in table 204, the column labeled "% of comp. with one or more wear ind. above 90%" shows the percentage of components in the given vehicle with one or more lifetime wear indicators calculated larger than 90% of their target value. The column labeled "% of comp. with one or more leading ind. above 1" shows the percentage of components in the given vehicle with one or more leading (non-wear related) failure indicators calculated larger than 1 (or other pre-specified value during setup), and the column labeled "Index" shows an overall maintenance urgency index for each vehicle. A leading failure indicator calculates a ratio of probability of failure with and without the sensor events. As used herein, 1=no increase in probability of failure. This index value can be calculated by a weighted average of the columns "AVG of Wear Indicators," "AVG of Leading Indicators," "% of comp. with one or more wear ind. above 90%," and "% of comp. with one or more leading ind. above 90%," using weights pre-specified by a user during system setup.

The list of vehicles (represented by rows in the table) in table 204 can be sorted (such as illustrated in FIG. 2) based on index value so that the vehicle with the highest urgency index is shown at the top of the table.

Additionally, as depicted in FIG. 2, graph 206 illustrates, in pictorial form, the four columns of "AVG of Wear Indicators," "AVG of Leading Indicators," "% of comp. with one or more wear ind. above 90%," and "% of comp. with one or more leading ind. above 1" of table 204 using a bubble for each vehicle (that is, data row). By way of example, the size of each bubble can correspond to the value of the "AVG of Wear Indicators," while the color of the bubble can correspond, for instance, to the value of the "AVG of Leading Indicators." Further, for example, the vertical position of the bubble can be based on the value of the "% of comp. with one or more wear ind. above 90%," and the horizontal position of the bubble can be based on the value of the "% of comp. with one or more leading ind. above 1." Accordingly, in this given example, the vehicle with the highest urgency for maintenance work can be represented as a large bubble with dark color at the northeast corner of the graph. A screen such as example screen 202 displays information for the user to prioritize vehicles at the site for maintenance work.

Figure 3:
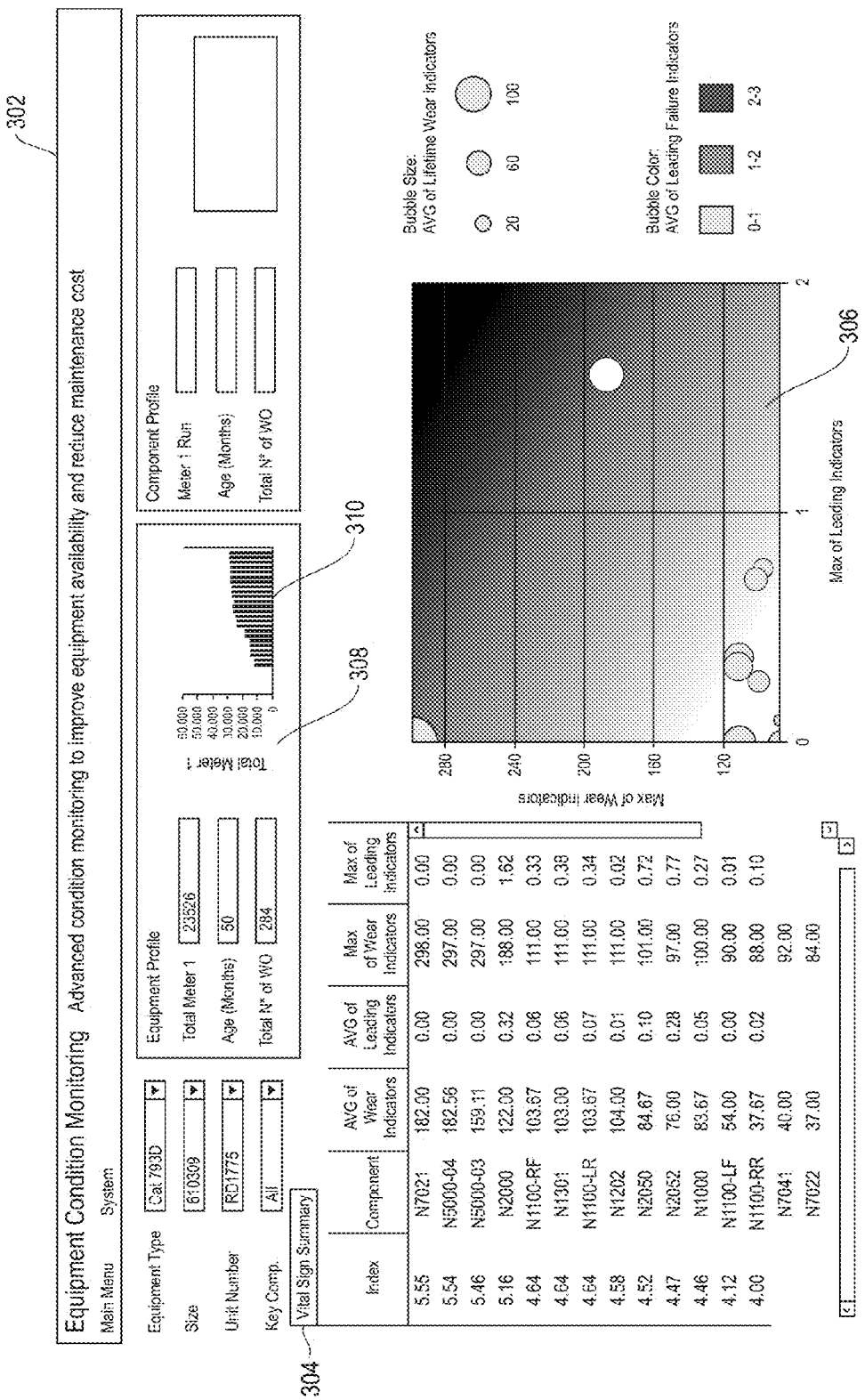
FIG. 3 is a diagram illustrating a screen shot of a vehicle summary screen, according to an example embodiment of the invention.

To obtain details on a specific vehicle, the user can select a vehicle using the drop down menu in the upper left region of screen 202 or by clicking on a particular bubble in the graph 206. The system will then produce a vehicle summary screen, such as shown in FIG. 3. By way of illustration, FIG. 3 depicts a screen shot 302 of a vehicle summary screen, according to an example embodiment of the invention. In table 304 on the left of screen 302, the column labeled "Component" shows the identifier of each targeted component of the selected vehicle, and the column labeled "AVG of Wear Indicators" shows the average of all lifetime wear indicators for each component of the selected vehicle calculated by the system (for example, a subset of the wear-related indicators described above). Further, the column labeled "AVG of Leading Indicators" shows the average of all leading (non-wear related) failure indicators for each component of the selected vehicle calculated by the system (for example, a subset of non-wear related indicators described above), and the column labeled "Max of Wear Indicators" shows the maximum value across all lifetime wear indicators for the given component in the selected vehicle. Additionally, as depicted in table 304, the column labeled "Max of Leading Indicators" shows the maximum value across all leading (non-wear related) failure indicators for the given component in the selected vehicle, and the column labeled "Index" shows an overall maintenance urgency index value for each component.

The index value can be calculated by a weighted average of the columns of "AVG of Wear Indicators," "AVG of Leading Indicators," "Max of Wear Indicators," and "Max of Leading Indicators," using weights pre-specified by the user during system setup. The list of components (represented by rows in table 304) can be sorted (such as depicted in example screen 302) based on the index value column so that the component with the highest urgency index value is shown at the top.

Graph 306 shows, in pictorial form, the columns of "AVG of Wear Indicators," "AVG of Leading Indicators," "Max of Wear Indicators," and "Max of Leading Indicators," using a bubble for each component (that is, data row). By way of example, the size of the bubble can correspond to the value of the "AVG of Wear Indicators" for the component, and the color of the bubble can correspond to the value of the "AVG of Leading Indicators" for the component. Also, the vertical position of the bubble can be based on the value of the "Max of Wear Indicators" for the component, and the horizontal position of the bubble can be based on the value of the "Max of Leading Indicators" for the component. Accordingly, in such an example as depicted via screen 302, the component with the highest urgency for maintenance work is represented by a large bubble with dark color at the northeast corner of the graph.

A screen such as example screen 302 illustrates, in part, which component(s) contribute(s) to the overall health status of the selected vehicle. Screen 302 also includes an "Equipment Profile" 308 of the selected vehicle, which includes the cumulative operating hours up to the present ("Total Meter 1"), the calendar age ("Age (Months)"), and the cumulative total number of work orders performed on the vehicle ("Total No of WO"). This profile provides a representation of the age of the vehicle and the vehicle's past tendency for repair. The graph 310 in the equipment profile shows a bar graph of the cumulative operating hours ("Total Meter 1") of all of the relevant vehicles at the same site, with the selected vehicle identified (for example, depicted in a different color). The bar graph can be sorted, for example, by the value of the cumulative operating hours and provides a representation of how the vehicle compares with other vehicles used at the same site in terms of age.

Figure 4:
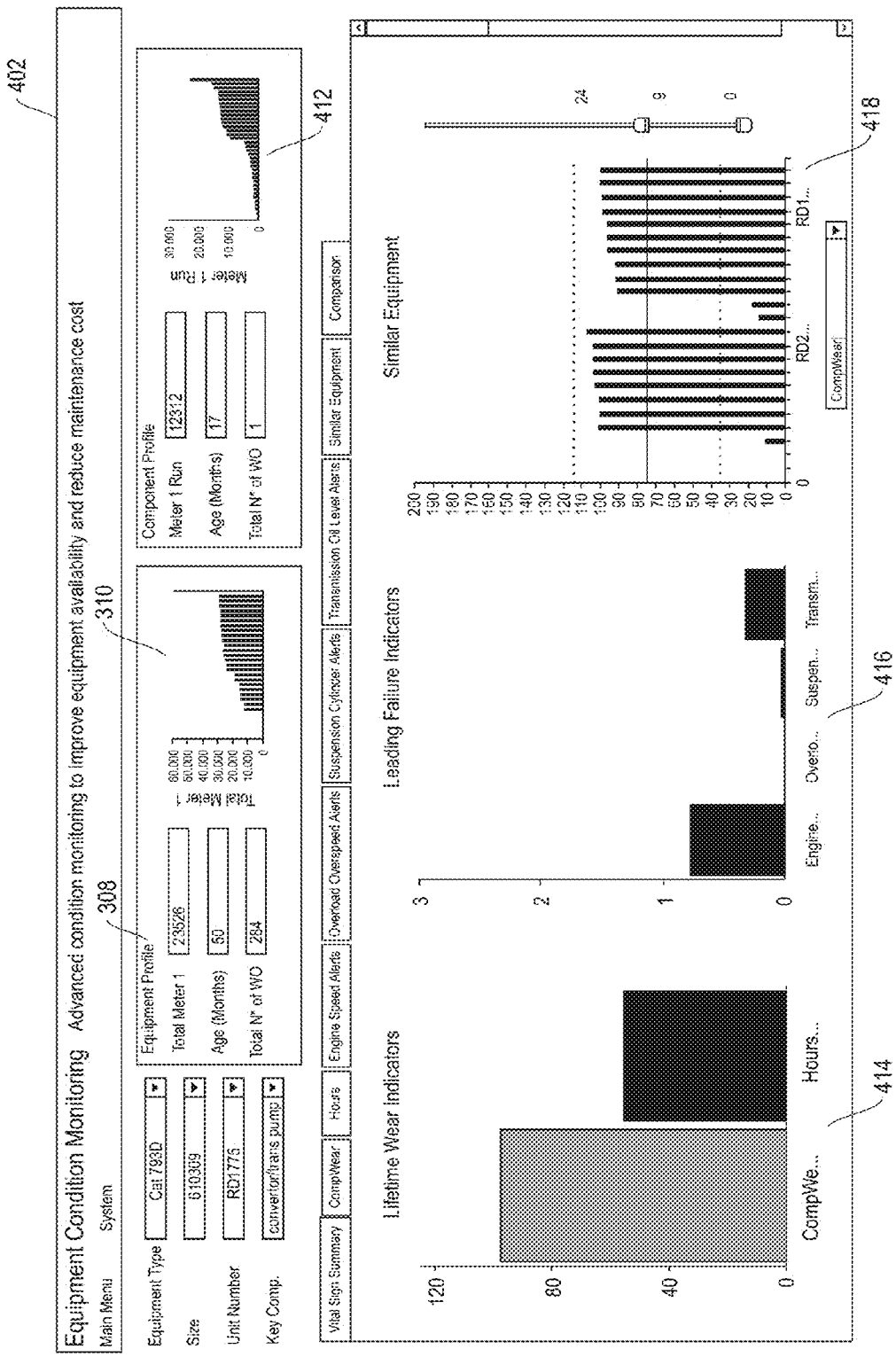
FIG. 4 is a diagram illustrating a screen shot of a component summary screen, according to an example embodiment of the invention.

To obtain details on a component of the selected vehicle, the user can select a component using the drop down menu at the upper left corner of screen 302 or by clicking on a particular bubble in graph 306. The system then produces a component summary screen, such as illustrated in FIG. 4. By way of illustration, FIG. 4 depicts a screen shot 402 of a component summary screen, according to an example embodiment of the invention.

As shown in FIG. 4, example screen 402 includes a component profile 412, which provides information for the selected component that is similar to the information shown in the equipment profile 308. Also represented in example screen shot 402 are three graphs: a "lifetime wear indicators" graph 414, a "leading failure indicators" graph 416, and a "similar equipment" graph 418. In the lifetime wear indicators graph 414, each of the lifetime wear indicators of the selected component, calculated using the latest data, is shown. In the leading failure indicators graph 416, each of the leading (non-wear related) failure indicators of the selected component, calculated using the latest data, is shown. In the similar equipment graph 418, a user-selected lifetime wear indicator or leading failure indicator is shown for the same component type as the selected component in the set of vehicles considered similar to the selected vehicle. The similar equipment graph 418 provides context to the current values of the lifetime wear and leading (non-wear related) failure indicators of the selected component, enabling the user to determine if the values are normal or not. Note that in one or more embodiments of the invention, each component (that is, component type) may have its own set of lifetime wear indicators or leading (non-wear related) failure indicators, different from other components.

As also depicted in the screen illustrated in FIG. 4, the user can click on the "Comparison" tab to choose two or more vehicles with the same component type so that the failure indicator values of the selected vehicles can be compared. This comparison provides information to help prioritize different vehicles for maintenance activities. Additionally, the user can click on the "Similar Equipment" tab to select the criteria used to define the set of vehicles considered similar to the selected vehicle. As noted herein, available criteria can include, for example, the site of the vehicles, vehicle type, vehicle model, the year of the vehicles, and the calendar age or cumulative operating hours of the vehicles or the components.

Figure 5:
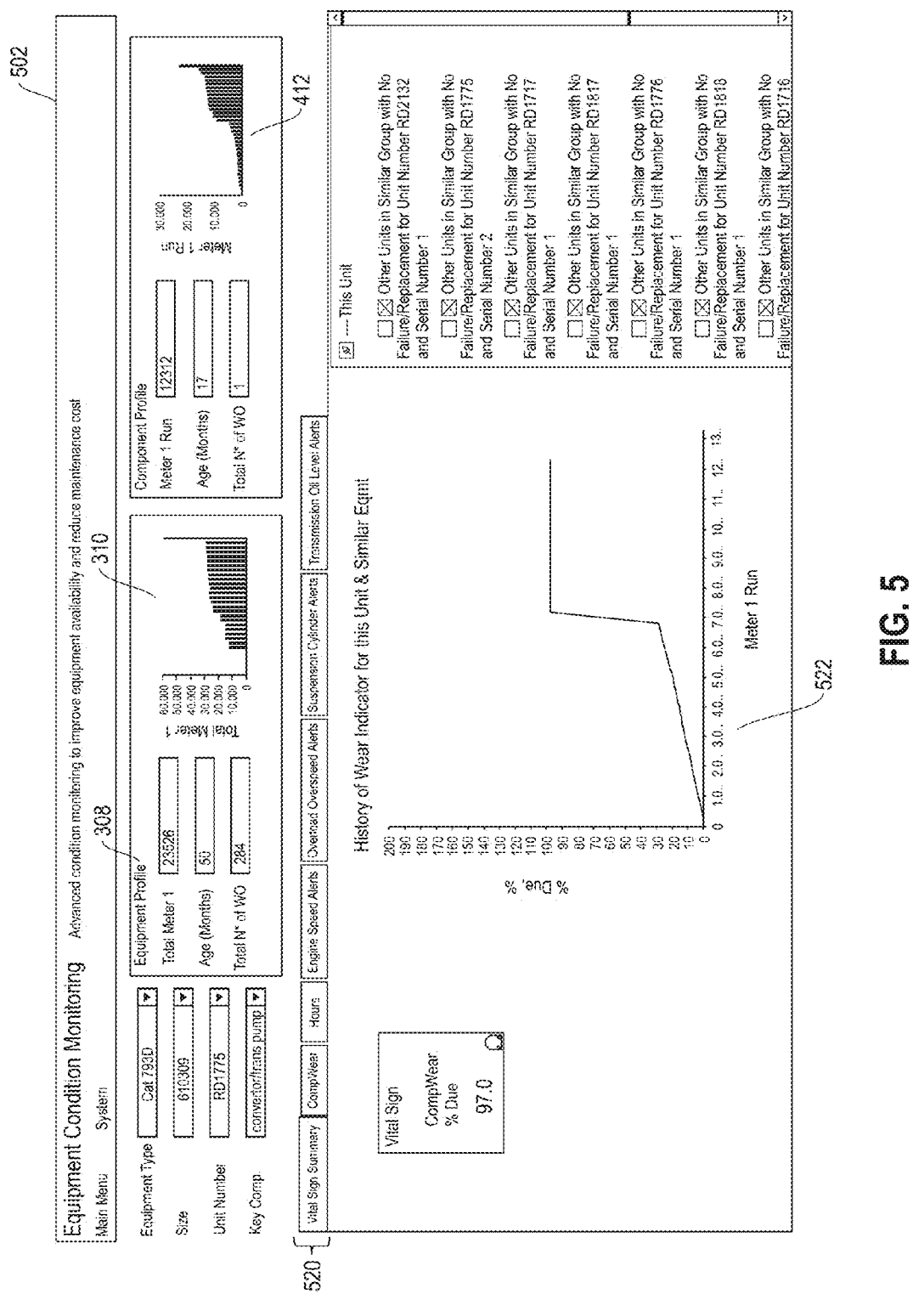

To obtain details on a particular lifetime wear indicator or a particular leading (non-wear related) failure indicator of the selected component of the selected vehicle, the user can click on the corresponding tab above graphs 414, 416 and 418 in screen 402. This set of tabs can be dynamically generated based on the set of indicators that exist for the selected component. After clicking on one a given indicator tab, the system produces a detailed indicator screen, such as depicted in FIG. 5. By way of illustration, FIG. 5 depicts a screen shot 502 of a component detail screen, according to an embodiment of the invention.

From a set of tabs 520, the selected tab ("CompWear" in example screen 502) shows the current value of the selected indicator, calculated using the latest data. Also, selection of a tab results in the display of a graph 522 of the history of the indicator values of the selected component in the selected vehicle. In one or more embodiments of the invention, the user can additionally select to view, in the same graph 522, the history of the same indicator of the same component type in one or more of the vehicles considered similar to the selected vehicle. The graph 522 distinguishes components that ended in a scheduled replacement, an unscheduled replacement, and those that are in an active state (that is, components that have not yet been replaced). As also seen in FIG. 5, the top half of the screen containing the equipment profile 308 and the component profile 412 remains the same as that in FIG. 4. In addition to the detailed indicator screens, two other functionalities can be accessed using the tabs 520 depicted in FIG. 5.

Figure 6:
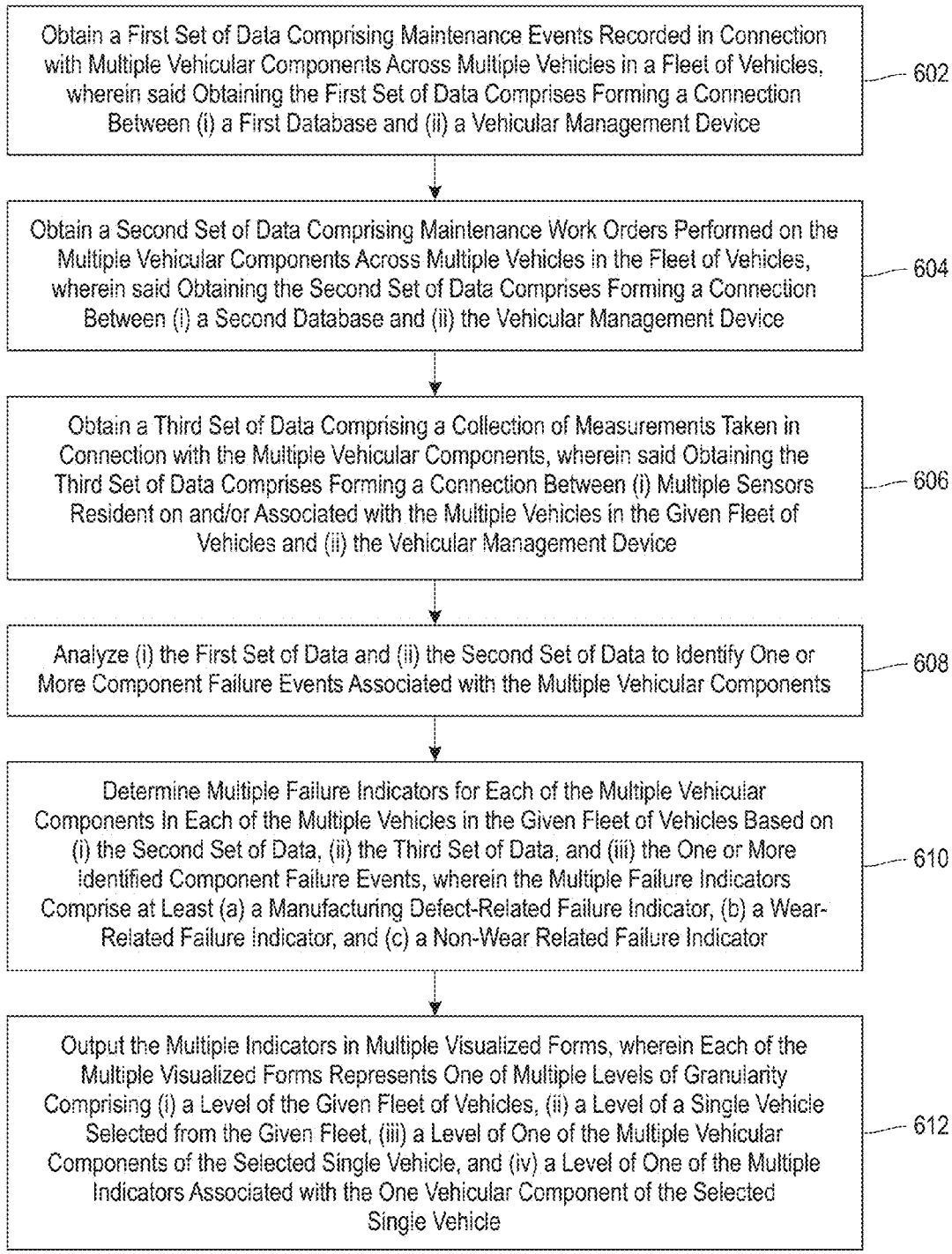
FIG. 6 is a flow diagram illustrating techniques according to an embodiment of the invention.

FIG. 6 is a flow diagram illustrating techniques according to an embodiment of the present invention. Step 602 includes obtaining a first set of data comprising maintenance events recorded in connection with multiple vehicular components across multiple vehicles in a fleet of vehicles, wherein said obtaining the first set of data comprises forming a connection between (i) a first database and (ii) a vehicular management device.

Step 604 includes obtaining a second set of data comprising maintenance work orders performed on the multiple vehicular components across multiple vehicles in the fleet of vehicles, wherein said obtaining the second set of data comprises forming a connection between (i) a second database and (ii) the vehicular management device.

Step 606 includes obtaining a third set of data comprising a collection of measurements taken in connection with the multiple vehicular components, wherein said obtaining the third set of data comprises forming a connection between (i) multiple sensors resident on and/or associated with the multiple vehicles in the given fleet of vehicles and (ii) the vehicular management device. Also, as noted in connection with FIG. 1, in one or more embodiments of the invention, sensors can alternatively (or additionally) transmit data to a given database, and such an embodiment of the invention can include accessing the sensor data via the given database.

Step 608 includes analyzing (i) the first set of data and (ii) the second set of data to identify one or more component failure events associated with the multiple vehicular components. Analyzing (i) the first set of data and (ii) the second set of data includes removing each event not associated with a work order from the maintenance work orders in the second set of data, removing each event not associated with a scheduled maintenance service from the maintenance events in the first set of data, and labeling each event specifying a premature failure as a component failure. Further, this analyzing step can include calculating, for each component replacement event in the maintenance events in the first set of data, a component lifetime achieved percentage for a given vehicular component corresponding to a given component replacement event by dividing lifetime operating hours of the given vehicular component by an expected lifetime of the given component. Also, one or more embodiments of the invention include labeling each component replacement event with a lifetime achieved percentage smaller than a pre-specified threshold as a component failure.

Step 610 includes determining multiple failure indicators for each of the multiple vehicular components in each of the multiple vehicles in the given fleet of vehicles based on (i) the second set of data, (ii) the third set of data, and (iii) the one or more identified component failure events, wherein the multiple failure indicators comprise at least (a) a manufacturing defect-related failure indicator, (b) a wear-related failure indicator, and (c) a non-wear related failure indicator.

Determining the manufacturing defect-related failure indicator includes determining a failure history of one or more vehicles that share one or more user-selected variables with the multiple vehicles in the given fleet of vehicles, wherein the user-selected variables can include vehicle location, vehicle type, vehicle model, vehicle year, and/or cumulative operating hours of a vehicle. Additionally, determining the wear-related failure indicator includes generating a cumulative wear-related indicator that combines two or more individual wear-related indicators for each of the multiple vehicular components in each of the multiple vehicles in the given fleet of vehicles. Further, determining the non-wear related failure indicator includes generating a cumulative non-wear related indicator that combines two or more individual non-wear related indicators for each of the multiple vehicular components in each of the multiple vehicles in the given fleet of vehicles.

Step 612 includes outputting the multiple indicators in multiple visualized forms, wherein each of the multiple visualized forms represents one selected from the group consisting of: (i) a level of the given fleet of vehicles, (ii) a level of a single vehicle selected from the given fleet, (iii) a level of one of the multiple vehicular components of the selected single vehicle, and (iv) a level of one of the multiple indicators associated with the one vehicular component of the selected single vehicle. As depicted, for example, in FIG. 2 through FIG. 5, the multiple visualized forms include at least (i) a graph and (ii) a table for each of the multiple levels of granularity.

Also, an additional aspect of the invention includes a vehicular management device that includes a vehicular component status determination engine, executing on the vehicular management device, to analyze (i) a first set of data comprising maintenance events recorded in connection with multiple vehicular components across multiple vehicles in a fleet of vehicles and (ii) a second set of data comprising maintenance work orders performed on the multiple vehicular components across the multiple vehicles in the given fleet of vehicles to identify one or more component failure events associated with the multiple vehicular components.

The vehicular management device also includes a vehicular component manufacturing defect-related failure indicator engine, executing on the vehicular management device, to calculate a manufacturing defect-related failure indicator for each of the multiple vehicular components in each of the multiple vehicles in the fleet of vehicles based on (i) the second set of data, (ii) a third set of data comprising a collection of measurements taken in connection with the multiple vehicular components, and (iii) the one or more identified component failure events.

Additionally, the vehicular management device includes a vehicular component wear-related failure indicator engine, executing on the vehicular management device, to calculate a wear-related failure indicator for each of the multiple vehicular components in each of the multiple vehicles in the given fleet of vehicles based on (i) the second set of data, (ii) the third set of data, and (iii) the one or more identified component failure events. Further, the vehicular management device also includes a vehicular component non-wear related failure indicator engine, executing on the vehicular management device, to calculate a non-wear related failure indicator for each of the multiple vehicular components in each of the multiple vehicles in the given fleet of vehicles based on (i) the second set of data, (ii) the third set of data, and (iii) the one or more identified component failure events.

Also, as further detailed herein, the vehicular component status determination engine, the vehicular component manufacturing defect-related failure indicator engine, the vehicular component wear-related failure indicator engine, and the vehicular component non-wear related failure indicator engine, are coupled to a graphical user interface for user manipulation of (i) the manufacturing defect-related failure indicator, (ii) the wear-related failure indicator, and (iii) the non-wear related failure indicator for each of the multiple vehicular components. In at least one embodiment of the invention, the graphical user interface enables user manipulation of multiple visualized forms of output, wherein each of the multiple visualized forms represents one of multiple levels of granularity comprising (i) a level of the given fleet of vehicles, (ii) a level of a single vehicle selected from the given fleet, (iii) a level of one of the multiple vehicular components of the selected single vehicle, and (iv) a level of one of the multiple indicators associated with the one vehicular component of the selected single vehicle.

Additionally, in such an embodiment, the level of a single vehicle selected from the given fleet includes information such as the following: (i) the number of the multiple vehicular components with a wear-related failure indicator above a pre-selected threshold, (ii) a pre-selected summary statistic (for example, an average value and/or a maximum value) across all wear-related failure indicators for the multiple vehicular components, (iii) the number of the multiple vehicular components with a non-wear related failure indicator above a pre-selected threshold, and (iv) the pre-selected summary statistic across all non-wear related failure indicators for the multiple vehicular components.

Also, the level of a single vehicle selected from the given fleet includes information such as the following: (i) the number of wear-related failure indicators above a pre-selected threshold for the single vehicle, (ii) a pre-selected summary statistic (for example, an average value and/or a maximum value) across all wear-related failure indicators for the multiple vehicular components of the single vehicle, (iii) the number of non-wear related failure indicators above a pre-selected threshold for the single vehicle, and (iv) a pre-selected summary statistic across all non-wear related failure indicators for the multiple vehicular components of the single vehicle. Further, the level of one of the multiple vehicular components of the selected single vehicle includes an identification of one or more potential component failures due to a wear-related cause, a non-wear related cause, and/or a manufacturing defect-related cause.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 7:
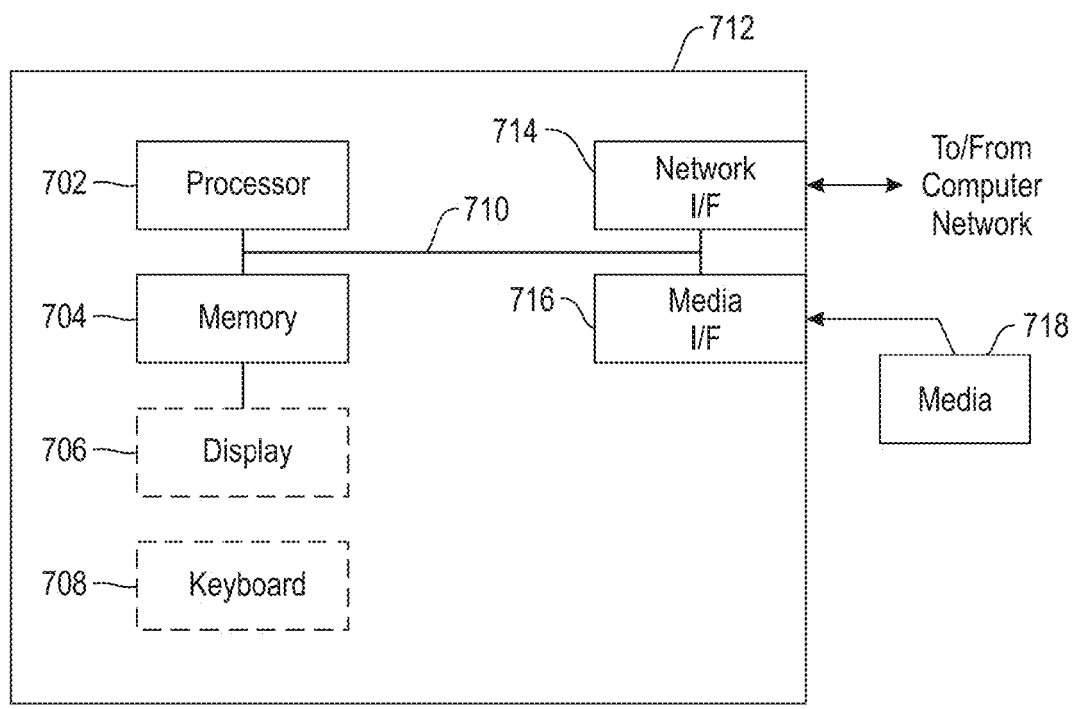
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, monitoring and managing multiple vehicular component failure causes in addition to wear under normal operation, such as event-driven failures and failures due to manufacturing defects.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising the following steps:
   obtaining a first set of data comprising maintenance events recorded in connection with multiple vehicular components across multiple vehicles in a fleet of vehicles, wherein said obtaining the first set of data comprises forming a connection between (i) a first database and (ii) a vehicular management device;
   obtaining a second set of data comprising maintenance work orders performed on the multiple vehicular components across multiple vehicles in the fleet of vehicles, wherein said obtaining the second set of data comprises forming a connection between (i) a second database and (ii) the vehicular management device;
   obtaining a third set of data comprising a collection of measurements taken in connection with the multiple vehicular components, wherein said obtaining the third set of data comprises forming a connection between (i) multiple sensors resident on and/or associated with the multiple vehicles in the given fleet of vehicles and (ii) the vehicular management device;
   analyzing (i) the first set of data and (ii) the second set of data to identify one or more component failure events associated with the multiple vehicular components;
   determining multiple failure indicators for each of the multiple vehicular components in each of the multiple vehicles in the given fleet of vehicles based on (i) the second set of data, (ii) the third set of data, and (iii) the one or more identified component failure events, wherein the multiple failure indicators comprise at least (a) a manufacturing defect-related failure indicator, (b) a wear-related failure indicator, and (c) a non-wear related failure indicator; and
   outputting the multiple indicators in multiple visualized forms, wherein each of the multiple visualized forms represents one selected from the group consisting of: (i) a level of the given fleet of vehicles, (ii) a level of a single vehicle selected from the given fleet, (iii) a level of one of the multiple vehicular components of the selected single vehicle, and (iv) a level of one of the multiple indicators associated with the one vehicular component of the selected single vehicle.

2. The method of claim 1, wherein said analyzing (i) the first set of data and (ii) the second set of data comprises removing each event not associated with a work order from the maintenance work orders in the second set of data.

3. The method of claim 1, wherein said analyzing (i) the first set of data and (ii) the second set of data comprises removing each event not associated with a scheduled maintenance service from the maintenance events in the first set of data.

4. The method of claim 1, wherein said analyzing (i) the first set of data and (ii) the second set of data comprises labeling each event specifying a premature failure as a component failure.

5. The method of claim 1, wherein said analyzing (i) the first set of data and (ii) the second set of data comprises calculating, for each component replacement event in the maintenance events in the first set of data, a component lifetime achieved percentage for a given vehicular component corresponding to a given component replacement event by dividing lifetime operating hours of the given vehicular component by an expected lifetime of the given component.

6. The method of claim 5, comprising:
   labeling each component replacement event with a lifetime achieved percentage smaller than a pre-specified threshold as a component failure.

7. The method of claim 1, wherein said determining the multiple failure indicators comprises determining the manufacturing defect-related failure indicator by determining a failure history of one or more vehicles that share one or more user-selected variables with the multiple vehicles in the fleet of vehicles.

8. The method of claim 7, wherein the one or more user-selected variables comprise vehicle location, vehicle type, vehicle model, vehicle year, and/or cumulative operating hours of a vehicle.

9. The method of claim 1, wherein said determining the multiple failure indicators comprises determining the wear-related failure indicator by generating a cumulative wear-related indicator that combines two or more individual wear-related indicators for each of the multiple vehicular components in each of the multiple vehicles in the fleet of vehicles.

10. The method of claim 1, wherein said determining the multiple failure indicators comprises determining the non-wear related failure indicator by generating a cumulative non-wear related indicator that combines two or more individual non-wear related indicators for each of the multiple vehicular components in each of the multiple vehicles in the fleet of vehicles.

11. The method of claim 1, wherein the multiple visualized forms comprise at least (i) a graph and (ii) a table for each of the multiple levels of granularity.

12. A computer program product, the computer program product comprising a non-transitory computer readable storage medium having program instructions embodied therewith, the program instructions executable by a computing device to cause the computing device to:
obtain a first set of data comprising maintenance events recorded in connection with multiple vehicular components across multiple vehicles in a fleet of vehicles, wherein said obtaining the first set of data comprises forming a connection between (i) a first database and (ii) a vehicular management device;
obtain a second set of data comprising maintenance work orders performed on the multiple vehicular components across multiple vehicles in the fleet of vehicles, wherein said obtaining the second set of data comprises forming a connection between (i) a second database and (ii) the vehicular management device;
obtain a third set of data comprising a collection of measurements taken in connection with the multiple vehicular components, wherein said obtaining the third set of data comprises forming a connection between (i) multiple sensors resident on and/or associated with the multiple vehicles in the given fleet of vehicles and (ii) the vehicular management device;
analyze (i) the first set of data and (ii) the second set of data to identify one or more component failure events associated with the multiple vehicular components;
determine multiple failure indicators for each of the multiple vehicular components in each of the multiple vehicles in the given fleet of vehicles based on (i) the second set of data, (ii) the third set of data, and (iii) the one or more identified component failure events, wherein the multiple failure indicators comprise at least (a) a manufacturing defect-related failure indicator, (b) a wear-related failure indicator, and (c) a non-wear related failure indicator; and
output the multiple indicators in multiple visualized forms, wherein each of the multiple visualized forms represents one selected from the group consisting of: (i) a level of the given fleet of vehicles, (ii) a level of a single vehicle selected from the given fleet, (iii) a level of one of the multiple vehicular components of the selected single vehicle, and (iv) a level of one of the multiple indicators associated with the one vehicular component of the selected single vehicle.

13. A system comprising:
a memory; and
at least one processor coupled to the memory and configured for:
obtaining a first set of data comprising maintenance events recorded in connection with multiple vehicular components across multiple vehicles in a fleet of vehicles, wherein said obtaining the first set of data comprises forming a connection between (i) a first database and (ii) a vehicular management device;
obtaining a second set of data comprising maintenance work orders performed on the multiple vehicular components across multiple vehicles in the fleet of vehicles, wherein said obtaining the second set of data comprises forming a connection between (i) a second database and (ii) the vehicular management device;
obtaining a third set of data comprising a collection of measurements taken in connection with the multiple vehicular components, wherein said obtaining the third set of data comprises forming a connection between (i) multiple sensors resident on and/or associated with the multiple vehicles in the given fleet of vehicles and (ii) the vehicular management device;
analyzing (i) the first set of data and (ii) the second set of data to identify one or more component failure events associated with the multiple vehicular components;
determining multiple failure indicators for each of the multiple vehicular components in each of the multiple vehicles in the given fleet of vehicles based on (i) the second set of data, (ii) the third set of data, and (iii) the one or more identified component failure events, wherein the multiple failure indicators comprise at least (a) a manufacturing defect-related failure indicator, (b) a wear-related failure indicator, and (c) a non-wear related failure indicator; and
outputting the multiple indicators in multiple visualized forms, wherein each of the multiple visualized forms represents one selected from the group consisting of: (i) a level of the given fleet of vehicles, (ii) a level of a single vehicle selected from the given fleet, (iii) a level of one of the multiple vehicular components of the selected single vehicle, and (iv) a level of one of the multiple indicators associated with the one vehicular component of the selected single vehicle.

14. A vehicular management device comprising:
a vehicular component status determination engine, executing on the vehicular management device, to analyze (i) a first set of data comprising maintenance events recorded in connection with multiple vehicular components across multiple vehicles in a fleet of vehicles and (ii) a second set of data comprising maintenance work orders performed on the multiple vehicular components across the multiple vehicles in the given fleet of vehicles to identify one or more component failure events associated with the multiple vehicular components;
a vehicular component manufacturing defect-related failure indicator engine, executing on the vehicular management device, to calculate a manufacturing defect-related failure indicator for each of the multiple vehicular components in each of the multiple vehicles in the fleet of vehicles based on (i) the second set of data, (ii) a third set of data comprising a collection of measurements taken in connection with the multiple vehicular components, and (iii) the one or more identified component failure events;

a vehicular component wear-related failure indicator engine, executing on the vehicular management device, to calculate a wear-related failure indicator for each of the multiple vehicular components in each of the multiple vehicles in the given fleet of vehicles based on (i) the second set of data, (ii) the third set of data, and (iii) the one or more identified component failure events; and a vehicular component non-wear related failure indicator engine, executing on the vehicular management device, to calculate a non-wear related failure indicator for each of the multiple vehicular components in each of the multiple vehicles in the given fleet of vehicles based on (i) the second set of data, (ii) the third set of data, and (iii) the one or more identified component failure events;

wherein the vehicular component status determination engine, the vehicular component manufacturing defect-related failure indicator engine, the vehicular component wear-related failure indicator engine, and the vehicular component non-wear related failure indicator engine, are coupled to a graphical user interface for user manipulation of (i) the manufacturing defect-related failure indicator, (ii) the wear-related failure indicator, and (iii) the non-wear related failure indicator for each of the multiple vehicular components.

15. The vehicular management device of claim 14, wherein the graphical user interface enables user manipulation of multiple visualized forms of output, wherein each of the multiple visualized forms represents one of multiple levels of granularity comprising (i) a level of the fleet of vehicles, (ii) a level of a single vehicle selected from the fleet, (iii) a level of one of the multiple vehicular components of the selected single vehicle, and (iv) a level of one of the multiple indicators associated with the one vehicular component of the selected single vehicle.

16. The vehicular management device of claim 15, wherein the level of a single vehicle selected from the fleet comprises (i) the number of the multiple vehicular components with a wear-related failure indicator above a pre-selected threshold, (ii) a pre-selected summary statistic across all wear-related failure indicators for the multiple vehicular components, (iii) the number of the multiple vehicular components with a non-wear related failure indicator above a pre-selected threshold, and (iv) the pre-selected summary statistic across all non-wear related failure indicators for the multiple vehicular components.

17. The vehicular management device of claim 16, wherein the pre-selected summary statistic comprises one of an average value and a maximum value.

18. The vehicular management device of claim 15, wherein the level of a single vehicle selected from the given fleet comprises (i) the number of wear-related failure indicators above a pre-selected threshold for the single vehicle, (ii) a pre-selected summary statistic across all wear-related failure indicators for the multiple vehicular components of the single vehicle, (iii) the number of non-wear related failure indicators above a pre-selected threshold for the single vehicle, and (iv) a pre-selected summary statistic across all non-wear related failure indicators for the multiple vehicular components of the single vehicle.

19. The vehicular management device of claim 18, wherein the pre-selected summary statistic comprises one of an average value and a maximum value.

20. The vehicular management device of claim 15, wherein the level of one of the multiple vehicular components of the selected single vehicle comprises an identification of one or more potential component failures due to a wear-related cause, a non-wear related cause, and/or a manufacturing defect-related cause.

* * * * *